United States Patent
Kung et al.

(10) Patent No.: US 6,692,268 B2
(45) Date of Patent: Feb. 17, 2004

(54) PC CARD

(75) Inventors: Gary Kung, Taipei Hsien (TW); Kuo Cheng Wang, Taipei Hsien (TW)

(73) Assignee: I/O Interconnect Inc., Taipei Hsien (TW)

( * ) Notice: Subject to any disclaimer, the term of this patent is extended or adjusted under 35 U.S.C. 154(b) by 0 days.

(21) Appl. No.: 10/164,000

(22) Filed: Jun. 7, 2002

(65) Prior Publication Data

US 2003/0216063 A1 Nov. 20, 2003

(30) Foreign Application Priority Data

May 14, 2002 (TW) ...................................... 91206817 U

(51) Int. Cl.$^7$ ................................................ H01R 1/00
(52) U.S. Cl. ...................................... 439/76.1; 439/946
(58) Field of Search .............................. 439/946, 76.1, 439/731; 174/35 R, 52.1; 361/737, 736, 759

(56) References Cited

U.S. PATENT DOCUMENTS

| | | | | |
|---|---|---|---|---|
| 4,223,370 A | * | 9/1980 | Quere et al. | 361/331 |
| 5,964,595 A | * | 10/1999 | Centofante | 439/76.1 |
| 6,166,913 A | * | 12/2000 | Fun et al. | 361/737 |
| 6,375,866 B1 | * | 4/2002 | Paneccasio, Jr. et al. | 252/511 |

* cited by examiner

Primary Examiner—Alexander Gilman
(74) Attorney, Agent, or Firm—Troxell Law Office PLLC

(57) ABSTRACT

A PC (PCMCIA) card is constructed to include a jacket formed of a plastic bottom cover shell and a plastic top cover shell and defining a receiving chamber, the top cover shell and the bottom cover shell each having a plurality of locating grooves symmetrically disposed at two sides, and an interface adapter mounted inside the receiving chamber, the interface adapter including a circuit board and two connectors at two sides of the circuit board, the connectors each having a plurality of locating rods disposed at two sides and respectively engaged into the locating grooves of the jacket.

8 Claims, 3 Drawing Sheets

PC CARD

BACKGROUND OF THE INVENTION

1. Field of the Invention

The present invention relates to a PC card and, more specifically, to such a PC card, which comprises a plastic jacket injection-molded from plastics and an interface adapter packed in the jacket. The plastic jacket can be transparent or opaque in any of a variety of colors.

2. Description of Related Art

Notebook computer is the main stream of information products. It is widely accepted for the advantage of high mobility. However, due to the market tendency toward a smaller size, there are limitations in capacity and expansion, and certain peripheral apparatus such as hard diskdrive, CD-ROM/CD-RW player cannot be directly inserted into the mainframe. Therefore, notebook computer providers provide notebook computers with a PC (PCMCIA) slot for the connection of a standard PC (PCMCIA) card.

A conventional PC card is comprised of a metal jacket formed of a top cover shell and a bottom cover shell respectively made of a metal sheet by stamping, and a circuit board installed in the metal jacket. The circuit board comprises a connector at one side, and an interface adapter at the other side. During assembly, the circuit board is attached with insulative sheet members, and then the interface adapter is fixedly fastened to the inside of the bottom cover shell, and then the top cover shell is covered on the bottom cover shell and riveted thereto. The insulative sheet members are respectively sandwiched in between the circuit board and the cover shells to prevent a short circuit. The cover shells provide an EMI (electromagnetic interface) protection function. However, the fabrication and installation of the cover shells are complicated, resulting in high manufacturing cost of the PC card. Further, because the jacket is formed of metal cover shells, its color design is limited.

SUMMARY OF THE INVENTION

The present invention has been accomplished under the circumstances in view. It is one object of the present invention to provide a PC card, which is easy and inexpensive to manufacture. It is another object of the present invention to provide a PC card, which has a plastic jacket that can be made transparent or opaque in any of a variety of colors.

It is still another object of the present invention to provide a PC card, which has means to protect the internal circuit against electromagnetic interference. To achieve these and other objects of the present invention, the PC card comprises a jacket formed of a plastic bottom cover shell and a plastic top cover shell and defining a receiving chamber, the top cover shell and the bottom cover shell each having a plurality of locating grooves symmetrically disposed at two sides, and an interface adapter mounted inside the receiving chamber, the interface adapter including a circuit board and two connectors at two sides of the circuit board, the connectors each having a plurality of locating rods disposed at two sides and respectively engaged into the locating grooves of the jacket. The jacket can be made transparent or opaque in any of a variety of colors.

BRIEF DESCRIPTION OF THE DRAWINGS

The present invention can be more fully understood by reference to the following detailed description and accompanying drawings, in which.

DETAILED DESCRIPTION OF THE PREFERRED EMBODIMENTS

Figure 1:
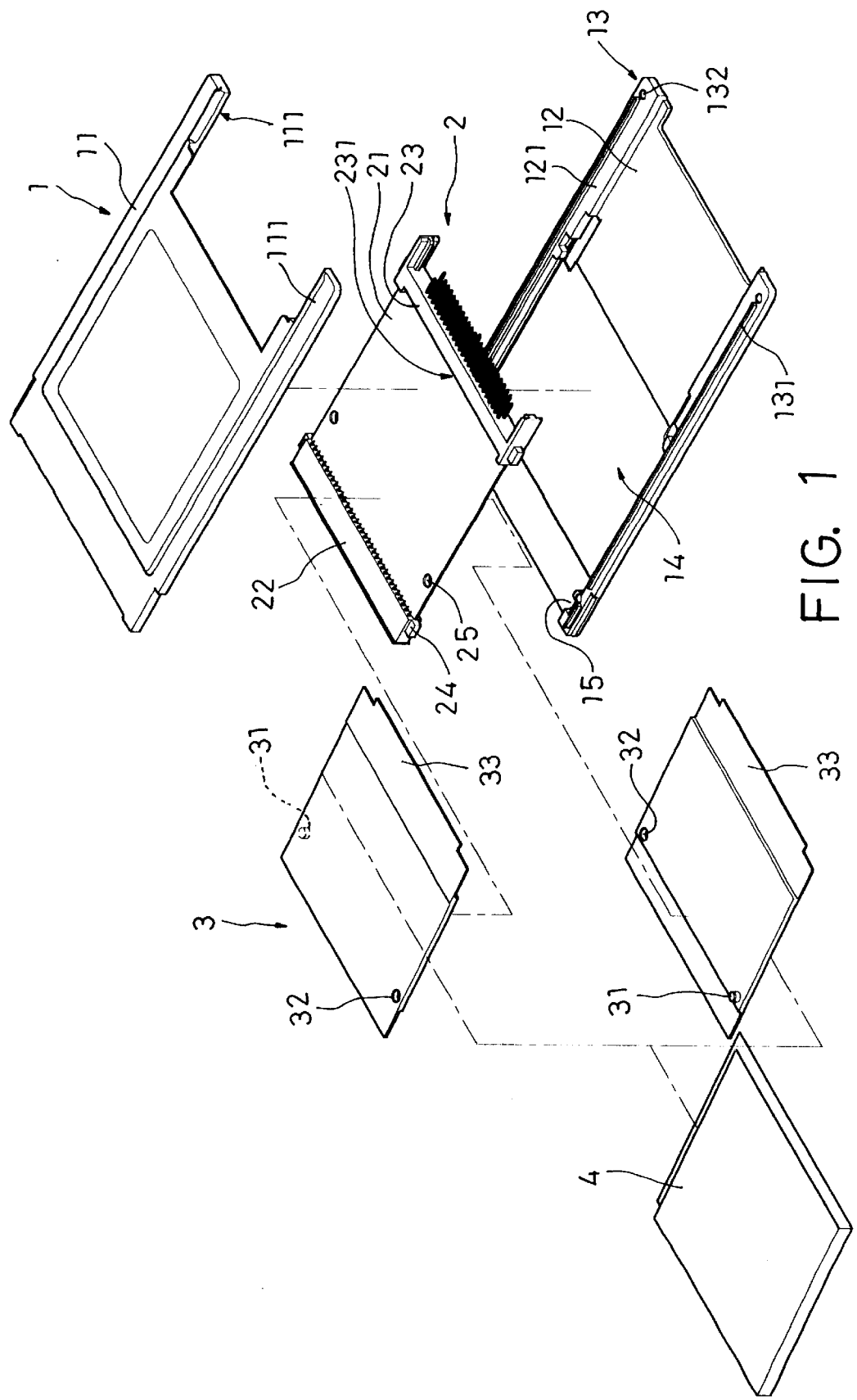
FIG. 1 is an exploded view of a PC card according to the present invention.

Referring to FIGS. from 1 through 3B, a PC card in accordance with the present invention is shown comprised of a jacket 1, and an interface adapter 2.

The jacket 1 is comprised of a top cover shell 11 and a bottom cover shell 12 respectively molded from plastics, and fastening means 13 adapted for securing the top cover shell 11 and the bottom cover shell 12 together. According to the present preferred embodiment, the top cover shell 11 comprises two protruded side flanges 111 disposed at two sides, and the bottom cover shell 12 comprises two protruded side flanges 121 disposed at two sides corresponding to the protruded side flanges 111 of the top cover shell 11. The fastening means 13 comprises male fastening members, for example, engagement ribs 131 and female fastening members, for example, engagement holes 132 symmetrically provided in the protruded side flanges 111, 121. By engaging respective engagement ribs 131 into respective engagement holes 132, the top cover shell 11 and the bottom cover shell 12 are fastened together, defining a receiving chamber 14, which receives the interface adapter 2. Further, locating grooves 15 are symmetrically provided in the protruded side flanges 111, 121 of the cover shells 11, 12 for the positioning of the interface adapter 2.

The interface adapter 2 comprises a circuit board 21. The circuit board 21 comprises a first connector (female connector) 22 and a second connector (male connector) 23 at two sides. The first connector 22 is adapted for connecting to a PC slot. The second connector 22 is adapted for connecting to a peripheral apparatus. Signal is converted by the circuit board 21 for enabling interconnection between the peripheral apparatus and the notebook computer. The connectors 22;23 of the interface adapter 2 have positioning rods 24 adapted for engaging into the locating grooves 15 to hold the interface adapter 2 firmly in the receiving chamber 14 inside the jacket 2. When installed, the receiving side of the first connector 22 is disposed in flush with one open side of the jacket 1, and the second connector 23 is firmly positioned inside the receiving chamber 14. After connection of the top cover shell 11 and the bottom cover shell 12, a ultrasonic sealing apparatus or bonding agent is employed to seal the periphery of the abutted area between the cover shells 11, 12.

In order to reinforce the structural strength of the interface adapter 2, electrically insulative reinforcing boards 3 are fastened to the top and bottom sides of the circuit board 21. The circuit board 21 comprises at least one pair of locating holes 25. The size of the reinforcing boards 3 is about the area between the first connector 22 and the second connector 23. The reinforcing boards 3 each have a locating pin 31 and a locating hole 32 disposed at two sides corresponding to the locating holes 25 of the circuit board 21. During installation, the reinforcing boards 3 are respectively attached to the top and bottom sides of the circuit board 21, enabling the locating pin 31 of one reinforcing board 3 to be engaged into one locating hole 25 of the circuit board 21 and the locating hole 32 of the other reinforcing board 3. The reinforcing board 3 each further comprise a protruded portion 33 disposed at a rear side corresponding to a respective recessed portion 231 in the second connector 23 for quick installation in the correct direction.

In order to protect against electromagnetic interference, metal isolation layers (copper foil or metallic coating) 4 are respectively covered on the surface of each reinforcing board 3. Additional metal isolation layers 4 may be electroplated or covered on the inner sidewalls of the top cover shell 11 and the bottom cover shell 12 for EMI protection.

Figure 2:
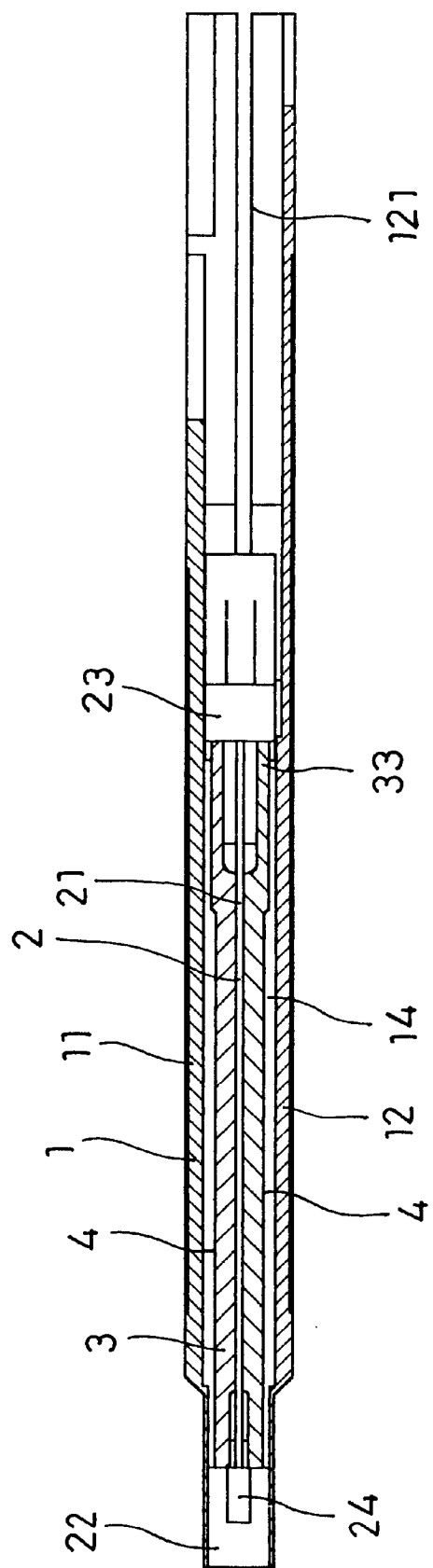
FIG. 2 is a sectional assembly view of the PC card according to the present invention.
Figure 3A:
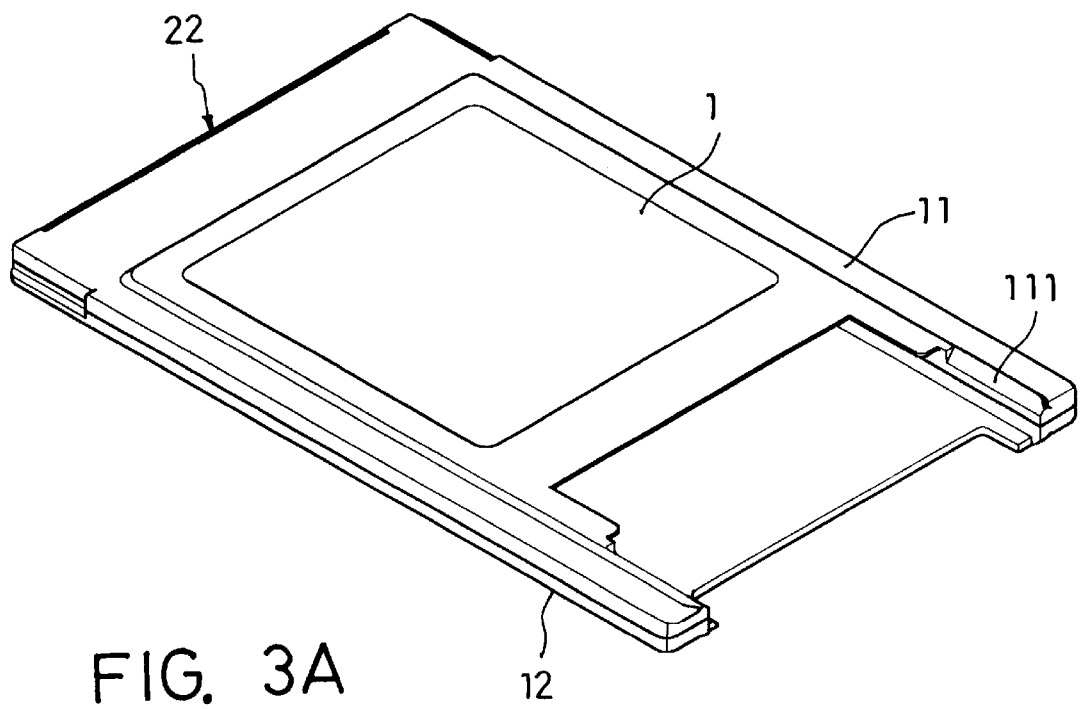
FIG. 3A is an oblique elevation of the PC card according to the present invention.
Figure 3B:
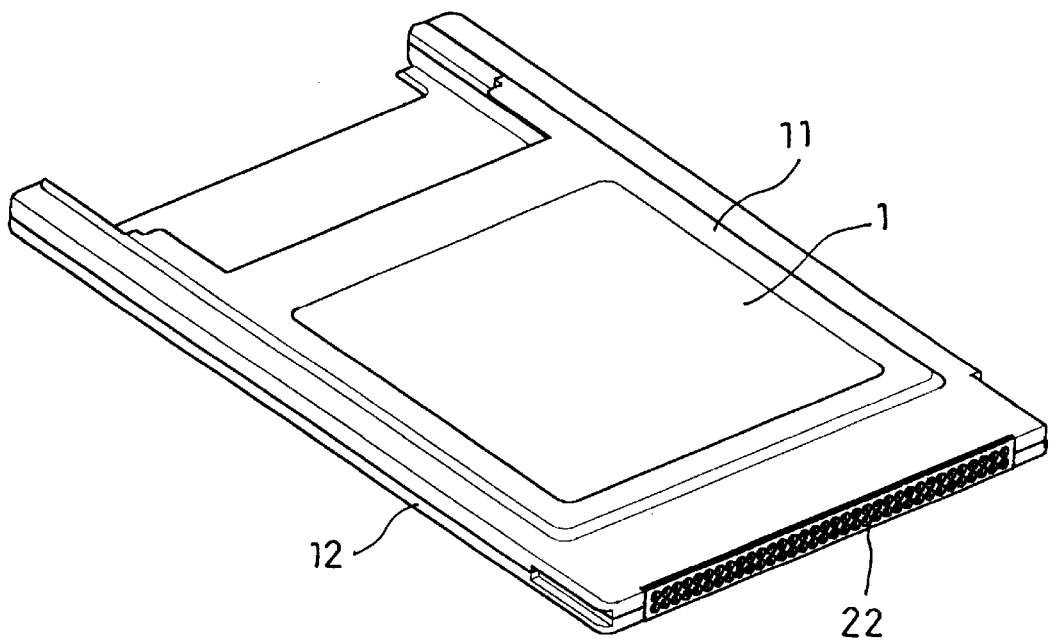
FIG. 3B is another oblique elevation of the PC card according to the present invention when viewed from another angle.

A prototype of PC card has been constructed with the features of FIGS. 1~3B. The PC card functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A PC Card comprising:
   a) a jacket having:
      i) a plastic top cover shell with two protruding side flanges;
      ii) a plastic bottom cover shell with two protruding side flanges;
      iii) a fastening device connecting the top cover shell to the bottom cover shell;
      iv) locating grooves formed between the two protruding side flanges of the top cover shell and the bottom cover shell respectively; and
      v) a receiving chamber formed between the top cover shell and the bottom cover shell; and
   b) an interface adaptor having a circuit board with a first connector and a second connector at opposing ends thereof, the first and second connectors each have positioning rods inserted into the locating grooves of the jacket, such that the interface adaptor is firmly held within the jacket;
   c) a first electrically insulative reinforcing board connected to a top of the interface adaptor; and
   d) a second electrically insulative reinforcing board connected to a bottom of the interface adaptor, wherein the circuit board includes at least two locating holes, and the first and the second electrically insulative reinforcing boards each has at least one locating hole and at least one locating pin, wherein the at least one locating pin of the first electrically insulative reinforcing board is inserted through a first of the at least two locating holes of the circuit board and into the at least one locating pin of the second electrically insulative reinforcing board and the at least one locating pin of the second electrically insulative reinforcing board is inserted through a second of the at least two locating holes of the circuit board and into the at least one locating hole of the first electrically insulative reinforcing board.

2. The PC Card according to claim 1, wherein the fastening device includes engagement ribs and engagement holes formed on the top cover shell and the bottom cover shell, wherein the top cover shell and the bottom cover shell are connected by inserting the engagement ribs into the engagement holes.

3. The PC Card according to claim 1, wherein a top and a bottom of the second connector each have a recessed portion, and the first and the second electrically insulative reinforcing boards each have a protruded portion inserted into a respective recessed portion of the second connector.

4. The PC Card according to claim 1, wherein the first and the second electrically insulative reinforcing boards are each coated with a metal isolation layer.

5. The PC Card according to claim 4, wherein the metal isolation layer is selected from a group consisting of copper foil and metal coating.

6. The PC Card according to claim 1, wherein inner side wall of the top cover shell and the bottom cover shell are coated with a metal isolation layer for EMI protection.

7. The PC Card according to claim 1, wherein the jacket has a color.

8. The PC Card according to claim 1, wherein the jacket is transparent.

* * * * *